US012741324B2

(12) United States Patent
Shikama

(10) Patent No.: US 12,741,324 B2
(45) Date of Patent: Sep. 22, 2026

(54) DRILLING TOOL

(71) Applicant: TUNGALOY CORPORATION, Fukushima (JP)

(72) Inventor: Hiroya Shikama, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 378 days.

(21) Appl. No.: 18/512,930

(22) Filed: Nov. 17, 2023

(65) Prior Publication Data

US 2024/0173779 A1 May 30, 2024

(30) Foreign Application Priority Data

Nov. 29, 2022 (JP) ................................. 2022-190311

(51) Int. Cl.
*B23B 51/00* (2006.01)

(52) U.S. Cl.
CPC ................................ *B23B 51/0007* (2022.01)

(58) Field of Classification Search
CPC .......... B23B 51/0007; B23B 2251/085; B23B 2251/122; B23B 2251/125; B23B 51/0004; B23B 2251/14; B23B 51/02; B23B 51/00
USPC ..... 408/1, 8–15, 67, 76, 115, 145, 207, 230, 408/224, 227
See application file for complete search history.

(56) References Cited

U.S. PATENT DOCUMENTS 5,957,631 A * 9/1999 Hecht ..................... B23B 51/00 408/230
6,238,151 B1 * 5/2001 Takagi .................... B23C 5/202 407/115
6,371,702 B1 * 4/2002 DeWald, Jr. ...... B23B 51/00035 408/233
6,984,094 B2 * 1/2006 Nuzzi .................. B23B 51/107 408/713
7,407,350 B2 * 8/2008 Hecht ..................... B23B 51/02 407/34
7,972,094 B2 * 7/2011 Men ........................ B23B 51/02 408/233
9,296,049 B2 * 3/2016 Schwaegerl ............ B23B 51/00
11,759,870 B2 * 9/2023 Ishimaru ................... B23C 5/10 407/53

(Continued)

FOREIGN PATENT DOCUMENTS

CA 2857354 C * 11/2015 ............. B23B 51/02
CN 105473262 A 4/2016

(Continued)

*Primary Examiner* — Robert F Long
(74) *Attorney, Agent, or Firm* — Studebaker Brackett PLLC

(57) ABSTRACT

It is possible to reduce shoulder parts from being damaged while suppressing an increase in cutting resistance or abrasion of edges at a time of machining.
A drilling tool for drilling machining includes: at least one major cutting edge; second cutting edges that are provided on an outer side of a tool radial direction of the major cutting edge; third cutting edges that are provided on the outer side of the tool radial direction of the second cutting edges; a first honing portion that is formed at the major cutting edge; second honing portions that are formed at the second cutting (Continued)

edges; and third honing portions that are formed at the third cutting edges. Honing sizes of the third honing portions are larger than a honing size of the first honing portion.

7 Claims, 6 Drawing Sheets

(56) References Cited

U.S. PATENT DOCUMENTS

| | | | | |
|---|---|---|---|---|
| 2003/0012613 | A1* | 1/2003 | Takiguchi | B23B 27/141<br>408/233 |
| 2006/0222469 | A1* | 10/2006 | Nuzzi | B23B 51/00<br>408/224 |
| 2010/0322728 | A1* | 12/2010 | Aare | B23B 51/02<br>408/230 |
| 2011/0318128 | A1* | 12/2011 | Schwagerl | B23B 51/02<br>408/229 |
| 2012/0315101 | A1* | 12/2012 | Osawa | B23B 51/02<br>408/226 |
| 2013/0259590 | A1 | 10/2013 | Shaheen | |
| 2013/0307178 | A1* | 11/2013 | Kress | B23B 51/009<br>264/156 |
| 2016/0263664 | A1* | 9/2016 | Son | B23B 51/06 |
| 2019/0061016 | A1* | 2/2019 | Sagara | B23B 29/043 |
| 2019/0061024 | A1* | 2/2019 | Shiroma | B23C 5/2226 |
| 2019/0366450 | A1 | 12/2019 | Nishikoori | |
| 2019/0375029 | A1 | 12/2019 | Katagiri | |
| 2022/0055123 | A1* | 2/2022 | Onchi | B23B 51/02 |
| 2023/0054585 | A1* | 2/2023 | Bernaden | B22F 7/06 |
| 2023/0173594 | A1 | 6/2023 | Ogawa | |
| 2023/0256524 | A1* | 8/2023 | Sato | B23B 51/02<br>408/230 |
| 2023/0278113 | A1* | 9/2023 | Van Essen | B23B 51/009<br>408/224 |

FOREIGN PATENT DOCUMENTS

| | | | | | |
|---|---|---|---|---|---|
| CN | 111299665 | A | * | 6/2020 | B24D 5/12 |
| DE | 10 2005 003 496 | A1 | | 7/2006 | |
| DE | 102013212122 | A1 | * | 1/2014 | B23P 15/32 |
| EP | 0320881 | A2 | * | 6/1989 | B23B 51/02 |
| JP | 2001096416 | A | * | 4/2001 | |
| JP | 2004-268230 | A | | 9/2004 | |
| JP | 2010115750 | A | * | 5/2010 | |
| JP | 2014-161946 | A | | 9/2014 | |
| JP | 2015-511547 | A | | 4/2015 | |
| JP | 2016-002617 | A | | 1/2016 | |
| JP | 2019-209439 | A | | 12/2019 | |
| JP | 2020-104202 | A | | 7/2020 | |
| JP | 2021-065967 | A | | 4/2021 | |
| JP | 2022023828 | A | * | 2/2022 | |
| WO | 2014/175396 | A1 | | 10/2014 | |
| WO | 2018/123937 | A1 | | 7/2018 | |
| WO | 2020/054702 | A1 | | 3/2020 | |
| WO | 2021/230176 | A1 | | 11/2021 | |
| WO | WO-2025204502 | A1 | * | 10/2025 | B23B 51/00 |

* cited by examiner 9
1
16
10

10
10t
1C
11
11f
12
12f
13
13f
VI
VII
14
14a
10b
11H
11r
11
12H
12r
12
13r
13
13H 10
11
11f
11r
12
12f
12r
13
13f
13r
V

DRILLING TOOL

BACKGROUND

Field

The present invention relates to a drilling tool.

Description of Related Art

A drilling tool is used as a tool for machining a hole in a workpiece (see, for example, Patent Publication WO 2018/123937, Patent Publication JP 2021-065967A, Patent Publication JP 2022-023828A, Patent Publication JP 2020-104202A, Patent Publication JP 2015-511547A). Conventionally, when machining is performed using such a drilling tool, a shoulder part of the tool is sometimes damaged extremely significantly. For example, an approach of providing an R part or a chamfer at a shoulder part of a tool is employed to address such a problem (see, for example, Patent Publication WO 2018/123937).

SUMMARY

However, while providing the R part or the chamfer makes it possible to reduce the shoulder part from being damaged, another problem arises in that an exit burr (an extra part that is formed protruding from a periphery on an exit side (back side) or the like when a through hole is machined in a metal or the like) becomes large. Although a method for providing a plurality of projected edges that are projected curves is proposed to deal with the exit burr (see Patent Publication JP 2021-065967A), this method causes another problem of an increaser in cutting resistance or abrasion of edges.

Therefore, an object of the present invention is to provide a drilling tool that can reduce shoulder parts from being damaged while suppressing an increase in cutting resistance or abrasion of edges at a time of machining.

One aspect of the present invention is a drilling tool for drilling machining that includes: at least one major cutting edge; a second cutting edge that is provided on an outer side of a tool radial direction of the major cutting edge; a third cutting edge that is provided on the outer side of the tool radial direction of the second cutting edge; a first honing portion that is formed at the major cutting edge; a second honing portion that is formed at the second cutting edge; and a third honing portion that is formed at the third cutting edge, and in which a honing size of the third honing portion is larger than a honing size of the first honing portion.

The drilling tool according to this aspect includes the cutting edges that have so-called double chamfer shapes, so that it is possible to suppress exit burrs while reducing the shoulder parts from being damaged in a through hole. Moreover, it is possible to suppress a rise in cutting resistance and vibration of the tool due to the rise by making the honing size of the first honing portion formed at the major cutting edge relatively small, and improve strength of the third cutting edge and further reduce the shoulder parts from being damaged at a time of machining by making the honing size of the third honing portion formed at the third cutting edge relatively large.

In the above drilling tool, a honing size of the second honing portion may be larger than the honing size of the first honing portion.

In the above drilling tool, a honing size of the second honing portion may be equal to the honing size of the first honing portion.

In the above drilling tool, a point angle of the third cutting edge may be 60° to 120°.

The honing size of the above drilling tool may be a width of each of the first honing portion, the second honing portion, and the third honing portion.

The width of the above drilling tool may be a width of the first honing portion, the second honing portion, or the third honing portion, seen from a side provided with a rake surface.

The width of the above drilling tool may be the width of the first honing portion, the second honing portion, or the third honing portion, seen from a side provided with a flank.

In the above drilling tool, the honing size may be a curvature radius of each of the first honing portion, the second honing portion, and the third honing portion.

The above drilling tool may be a head-exchangeable drill that includes a body and a head that is removable from the body, and the major cutting edge, the second cutting edge, and the third cutting edge may be formed at the head.

DETAILED DESCRIPTION

Hereinafter, a preferred embodiment of a drilling tool according to the present invention will be described in detail with reference to the drawings (see, for example, FIG. 1).

A case where a drilling head-exchangeable drill 1 is used will be described as an example of the drilling tool below (see, for example, FIG. 1). The drilling head-exchangeable drill 1 according to the present embodiment is a drill that includes a body 9, and an exchangeable head 10 that is removable from a leading end part 9*t* of the body 9.

Figure 1:
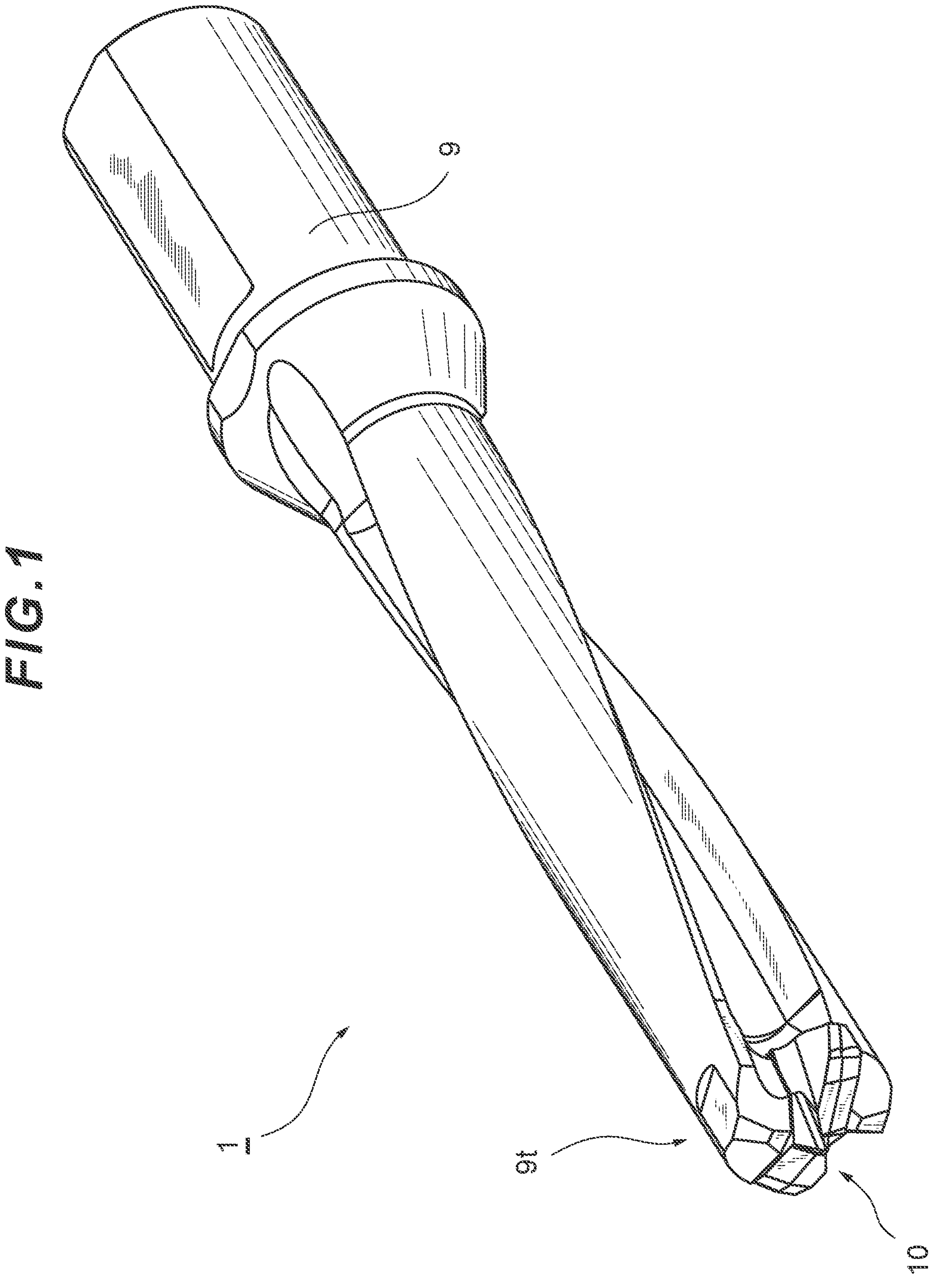
FIG. 1 is a perspective view of entirety of a drilling head-exchangeable drill according to an embodiment of the present invention.

The body 9 is provided to rotate about a rotational axis 1C that extends along a longitudinal direction of the body 9, is mounted on a milling device (not illustrated), and rotates about this rotational axis 1C, and thereby the head 10 mounted on this leading end part 9*t* performs drilling machining on a workpiece (see FIG. 1).

The head 10 is formed as an exchangeable head that is removable from the leading end part 9*t* of the body 9 (see FIG. 1). The head 10 according to the present embodiment includes major cutting edges (first cutting edges) 11, second cutting edges 12, third cutting edges 13, and a screwing cutout part 14 (see, for example, FIG. 2).

Figure 3:
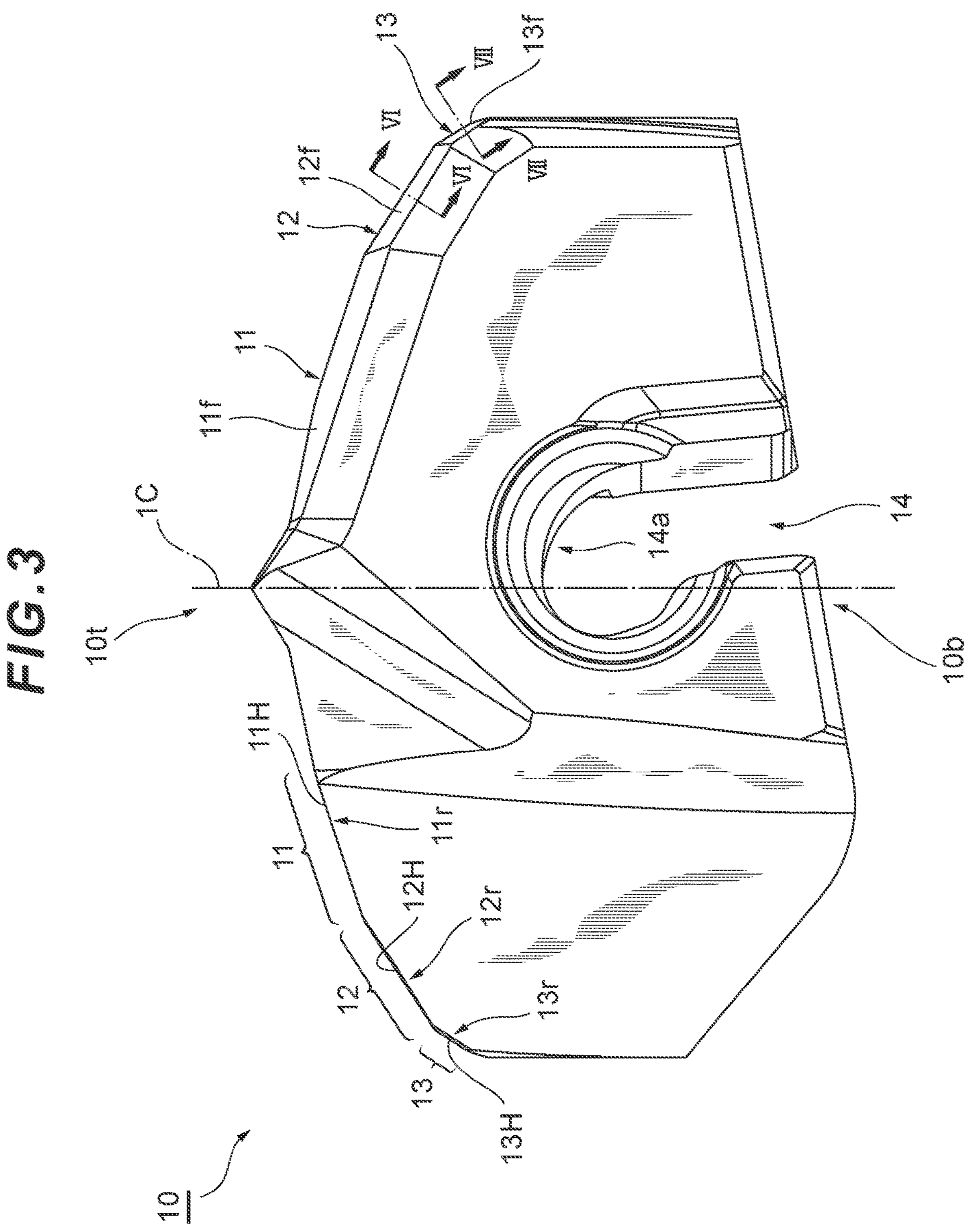
FIG. 3 is a view illustrating the head along an axis of a screwing cutout part in a state where a leading end part of the head is arranged on an upper side and a base end part is arranged on a lower side.
Figure 4:
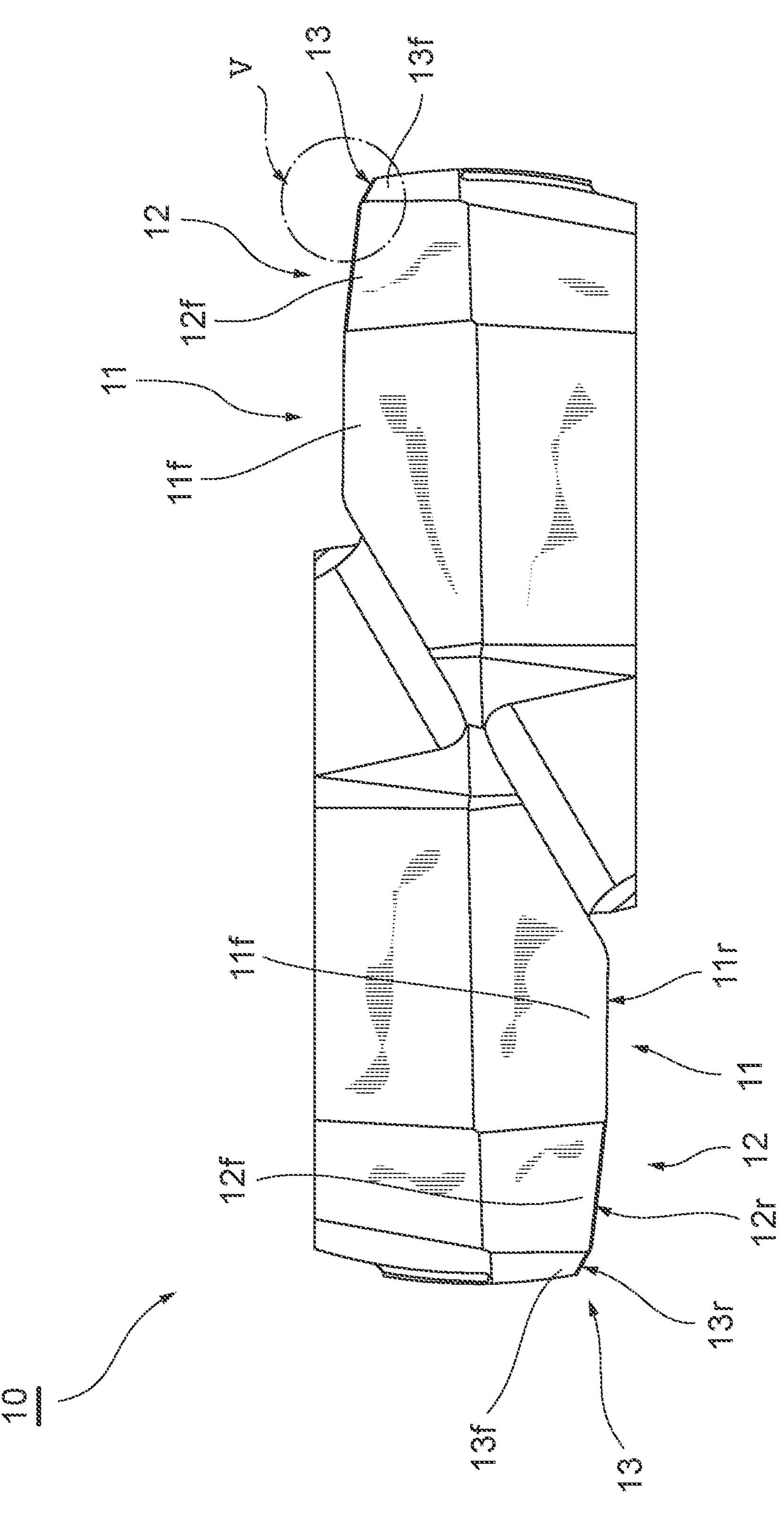
FIG. 4 is a view illustrating the head seen from a leading end part side along a rotational axis of the head.

The major cutting edge 11 is a cutting edge that plays a major role of generating chips at a time of cutting (see, for example, FIG. 3). The head 10 according to the present embodiment is provided with one set of the two major cutting edges 11 that are symmetrically arranged with the rotational axis 1C interposed therebetween (see FIG. 4). Each major cutting edge 11 is provided with a rake face 11*r* and a flank 11*f*.

Figure 2:
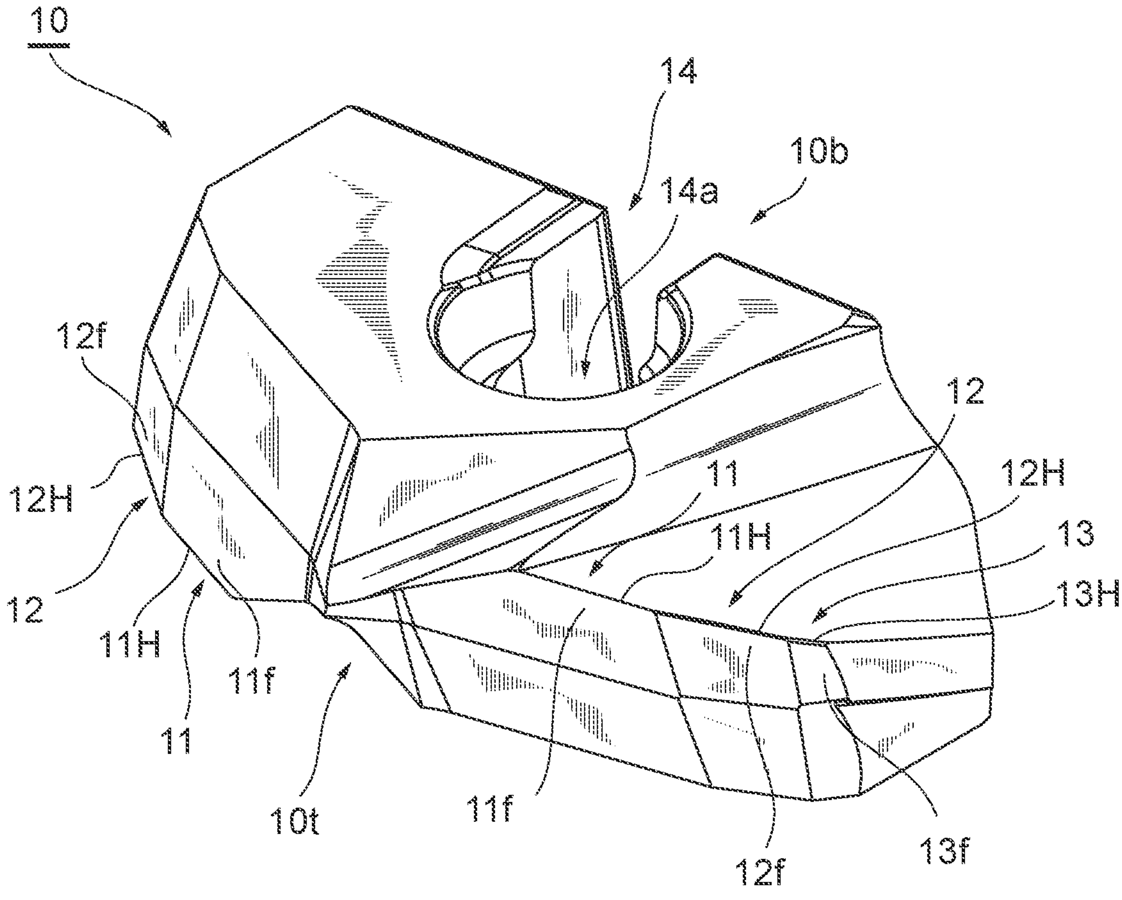
FIG. 2 is a perspective view illustrating an example of a head used for the drilling head-exchangeable drill.
Figure 5:
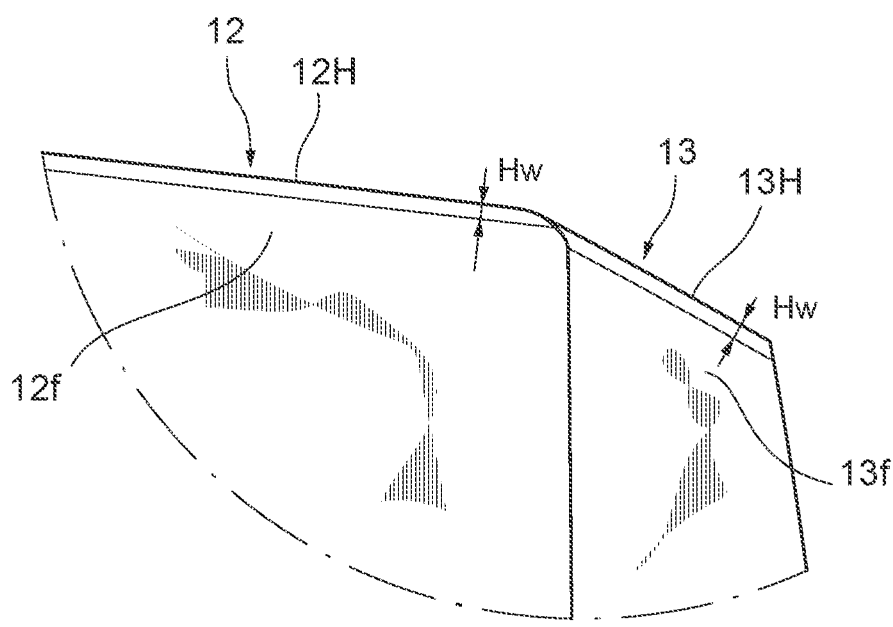
FIG. 5 is a view illustrating an enlarged part of the head indicated by V in FIG. 4.

Furthermore, an edge tip of the major cutting edge 11 is provided with a honing portion 11H whose honing size HS1 takes a predetermined value (see FIGS. 2 and 5). Generally, a term "honing" is used as a term indicating a state of a (major) cutting edge, and, more specifically, as a term that indicates processing of increasing rigidity of an edge and preventing a fracture by, for example, scraping part of the edge tip, or such a state.

Taking this point into account, a part formed by performing such processing on the cutting edge or a part in such a state is referred to as a "honing portion" in this description. Furthermore, as a term that indicates the size of the honing portion or the degree of processing, an expression of the above "honing size" is used in this description. Specific contents of the "honing size" is not limited in particular, and may be contents (parameter) that indicates the size of the honing portion or the degree of processing. More specifically, for example, the width of the honing portion (honing width Hw) may indicate a honing size (see FIG. 5), the width of the honing portion in a case where the cutting edge (e.g., major cutting edge 11) is seen from a side provided with the rake surface (e.g., 11*r*) of the cutting edge may indicate the honing size, or the width of the honing portion in a case where the cutting edge (e.g., major cutting edge 11) is seen from a side provided with a flank (e.g., 11*f*) of the cutting edge may indicate the honing size. Alternatively, a curvature radius Hcr of the honing portion may indicate the honing size. In the present embodiment, in an example, the first honing portion 11H of the major cutting edge 11 is in a so-called round honing state (or R honing state) where the curvature radius is Hcr1 and the surface shape has arc-shaped roundness.

Figure 6:
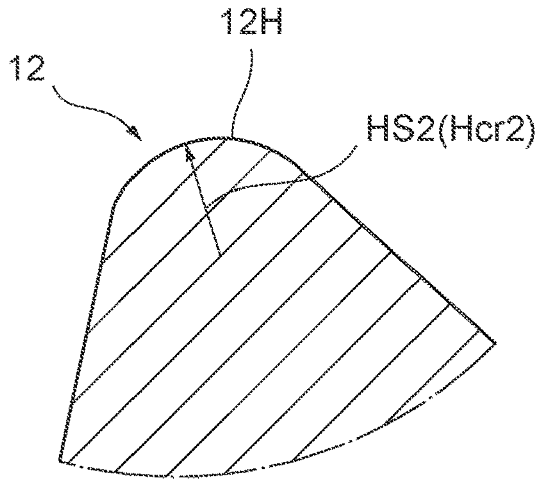
FIG. 6 is a view illustrating a cross-sectional shape of the head taken along line VI-VI in FIG. 3.

The second cutting edge 12 is a cutting edge that is provided on an outer side of a tool radial direction of the major cutting edge 11 (a direction perpendicular to the rotational axis 1C) (see, for example, FIG. 3). The head 10 according to the present embodiment is provided with one set of the two second cutting edges 12 that are symmetrically disposed with the rotational axis 1C interposed therebetween (see FIG. 4). Each second cutting edge 12 is provided with a rake surface 12*r* and a flank 12*f*. An edge tip of the second cutting edge 12 is provided with a honing portion 12H whose honing size HS2 takes a predetermined value (see FIGS. 2 and 5). In the present embodiment, in an example, the second honing portion 12H of the second cutting edge 12 is in a round honing state (or R honing state) where the curvature radius is Hcr2 and the surface shape has arc-shaped roundness (see FIG. 6).

Figure 7:
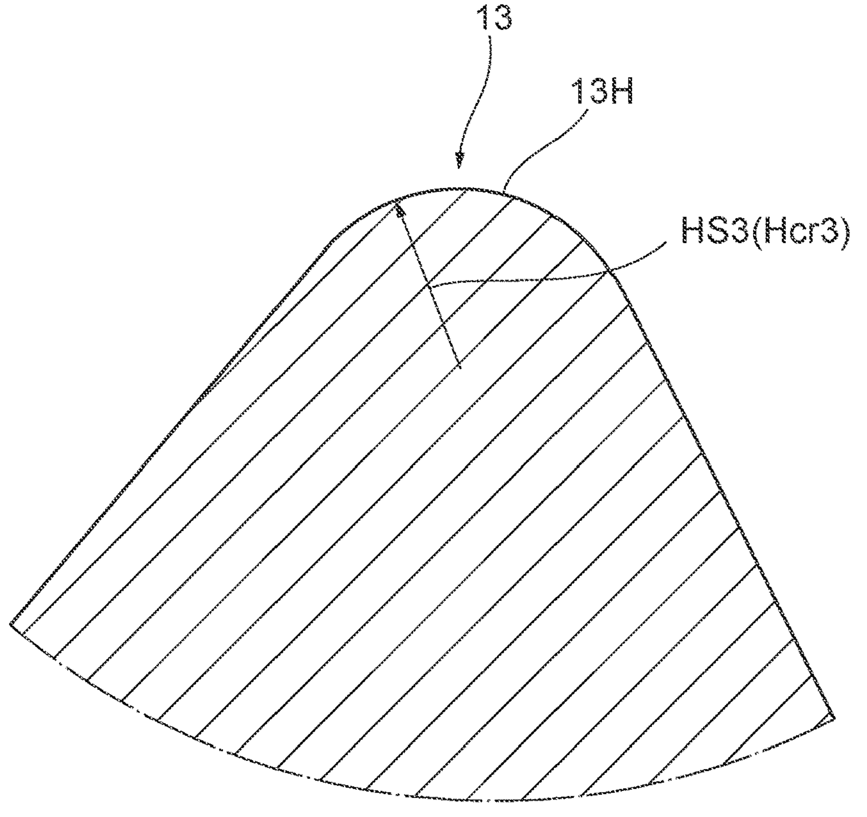
FIG. 7 is a view illustrating the cross-sectional shape of the head taken along line VII-VII in FIG. 3.

The third cutting edge 13 is a cutting edge that is provided on the more outer side of the tool radial direction of the second cutting edge 12 (see, for example, FIG. 3). The head 10 according to the present embodiment is provided with one set of the two third cutting edges 13 that are symmetrically disposed with the rotational axis 1C interposed therebetween (see FIG. 4). Each third cutting edge 13 is provided with a rake surface 13*r* and a flank 13*f*. The third cutting edges 13 are provided at point angles of a predetermined range (angles at which the third cutting edges 13 are projected in parallel on a plane parallel to the rotational axis 1C of the drilling head-exchangeable drill 1) such as point angles of 60° to 120° (see FIGS. 3 and 5). An edge tip of the third cutting edge 13 is provided with a honing portion 13H whose honing size HS3 takes a predetermined value (see FIGS. 2 and 5). In the present embodiment, in an example, the third honing portion 13H of the third cutting edge 13 is in a round honing state (or R honing state) where the curvature radius is Hcr3 and the surface shape has arc-shaped roundness (see FIG. 7).

The screwing cutout part 14 is a recessed part that is provided on a base end part 10*b* side of the head 10, and includes a hole part 14*a* that is provided to match with the size of a set screw (not illustrated) (see FIGS. 2 and 3). By screwing the set screw inserted in the hole part 14*a* to a female screw part (not illustrated) of the leading end part 9*t* of the body 9, it is possible to mount the head 10 on the body 9 (see FIG. 1).

According to the head 10 of the above drilling head-exchangeable drill 1, respective sizes or relative mutual sizes of the honing size HS1 of the first honing portion 11H of the major cutting edge 11, the honing size HS2 of the second honing portion 12H of the second cutting edge 12, and the honing size HS3 of the third honing portion 13H of the third cutting edge 13 can be set as appropriate. In the present embodiment, in an example, the honing size HS3 of the third honing portion 13H is larger than both of the honing size HS1 of the first honing portion 11H and the honing size HS2 of the second honing portion 12H. As for the honing size HS1 of the first honing portion 11H and the honing size HS2 of the second honing portion 12H, the honing size HS2 of the second honing portion 12H may be larger than the honing size HS1 of the first honing portion 11H (HS1<HS2<HS3), or the honing sizes HS1 and HS2 may be equal (HS1=HS2<HS3). Note that an aspect in a case where the honing size HS1 of the first honing portion 11H is small also includes an aspect that there is hardly any honing portion 11H, that is, the honing portion 11H is a sharp cutting edge.

The drilling head-exchangeable drill 1 according to the present embodiment described above includes the head 10 of a so-called double chamfer shape that includes the major cutting edges 11 and, in addition, the second cutting edges 12 and the third cutting edges 13, and in which the second cutting edges 12 and the third cutting edges 13 are provided with the second honing portions 12H and the third honing portions 13H, respectively, so that it is possible to minimize exit burrs while reducing shoulder parts of the head 10 from being damaged in a through hole of the workpiece. Furthermore, the drilling head-exchangeable drill 1 according to the present embodiment suppresses a rise in cutting resistance and tool vibration due to the rise by making the honing sizes HS1 of the first honing portions 11H formed at the major cutting edges 11 of the head 10 relatively smaller (than at least the honing sizes HS3 of the third honing portions 13H in the present embodiment), and improve strength of the third cutting edges 13 and further reduce the shoulder parts from being damaged at the time of machining by making the honing sizes HS3 of the third honing portions 13H formed at the third cutting edges 13 relatively larger (than at least the honing sizes HS1 of the first honing portions 11H in the present embodiment). Consequently, it is possible to further increase an operational life of the head 10.

Note that the above-described embodiment is the preferred embodiment of the present invention, yet is not limited to this, and can be variously modified and carried out without departing from the gist of the present invention. For example, the above-described embodiment has described the drilling head-exchangeable drill 1, yet is merely a preferred example of the drilling tool. In addition, for example, it goes without saying that the present invention is applicable to various drilling tools such as an integrated drill.

Furthermore, the above-described embodiment has described the honing sizes of the honing portions that are in the so-called round honing state (or R honing state) and the sizes of the curvature radii Hcr as parameters, yet is merely a preferred example. In addition, although not illustrated in particular, the width of the honing portion (honing width Hw) can indicate the honing size as described above (i.e., whether the honing size is larger or smaller can be expressed using a different parameter indicating the size of the width). In this case, the width of the honing portion seen from the side provided with the rake surface or the width of the honing portion seen from the side provided with the flank may indicate the honing size. Additionally, in a case where the honing portion is in the round honing state (or R honing state) as described in the present embodiment, the width of the honing portion seen from the side provided with the rake surface, and the width of the honing portion seen from the side provided with the flank are substantially equal.

The present invention is suitably applied to a drilling tool that is a drilling head-exchangeable drill.

What is claimed is:

1. A drilling tool for drilling machining, comprising:
at least one major cutting edge;
a second cutting edge that is provided on an outer side of a tool radial direction of the major cutting edge;
a third cutting edge that is provided on the outer side of the tool radial direction of the second cutting edge;
a first honing portion that is formed at the major cutting edge;
a second honing portion that is formed at the second cutting edge; and
a third honing portion that is formed at the third cutting edge,
wherein a honing size of the third honing portion is larger than a honing size of the first honing portion; and
wherein the honing size is a curvature radius of each of the first honing portion, the second honing portion, and the third honing portion.

2. The drilling tool according to claim 1, wherein a honing size of the second honing portion is larger than the honing size of the first honing portion.

3. The drilling tool according to claim 1, wherein a honing size of the second honing portion is equal to the honing size of the first honing portion.

4. The drilling tool according to claim 3, wherein a point angle of the third cutting edge is 60° to 120°.

5. A drilling tool for drilling machining, comprising:
at least one major cutting edge;
a second cutting edge that is provided on an outer side of a tool radial direction of the major cutting edge;
a third cutting edge that is provided on the outer side of the tool radial direction of the second cutting edge;
a first honing portion that is formed at the major cutting edge;
a second honing portion that is formed at the second cutting edge; and
a third honing portion that is formed at the third cutting edge,
wherein a honing size of the third honing portion is larger than a honing size of the first honing portion;
wherein the honing size is a width of each of the first honing portion, the second honing portion, and the third honing portion; and
wherein the width is a width of the first honing portion, the second honing portion, or the third honing portion, seen from a side provided with a rake surface.

6. A drilling tool for drilling machining, comprising:
at least one major cutting edge;
a second cutting edge that is provided on an outer side of a tool radial direction of the major cutting edge;
a third cutting edge that is provided on the outer side of the tool radial direction of the second cutting edge;
a first honing portion that is formed at the major cutting edge;
a second honing portion that is formed at the second cutting edge; and
a third honing portion that is formed at the third cutting edge,
wherein a honing size of the third honing portion is larger than a honing size of the first honing portion;
wherein the honing size is a width of each of the first honing portion, the second honing portion, and the third honing portion; and
wherein the width is the width of the first honing portion, the second honing portion, or the third honing portion, seen from a side provided with a flank.

7. The drilling tool according to claim 1, wherein the drilling tool is a head-exchangeable drill that includes a body and a head that is removable from the body, and the major cutting edge, the second cutting edge, and the third cutting edge are formed at the head.

* * * * *